(No Model.)
H. W. DEAN.
TACK FEEDING TUBE.
No. 418,695. Patented Jan. 7, 1890.
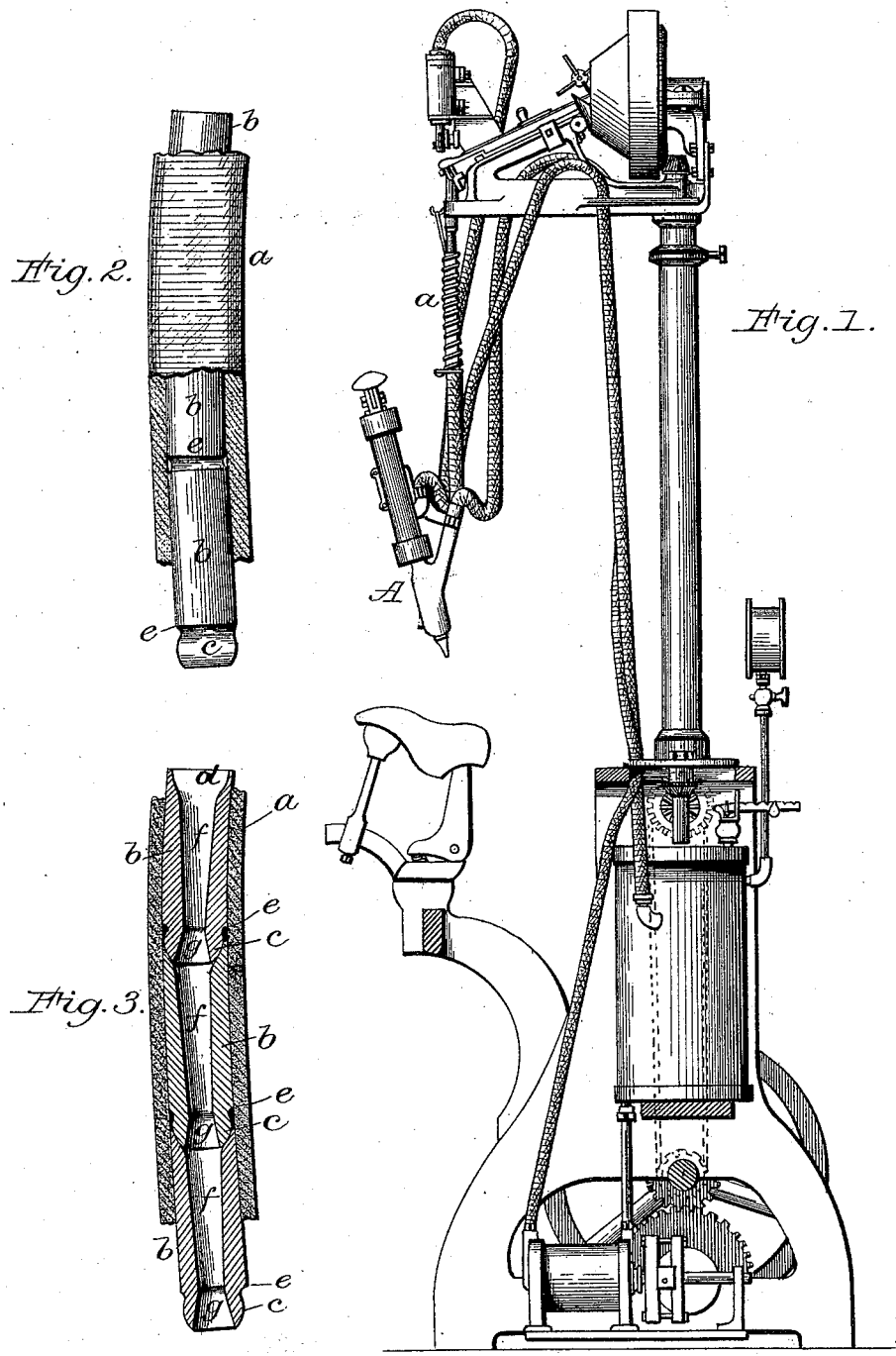
Witnesses,
Walter H. Pumphrey
Howell Bartle
Inventor;
Henry W. Dean
By Johnson and Johnson
his Attorneys
N. PETERS, Photo-Lithographer, Washington, D. C.

UNITED STATES PATENT OFFICE.

HENRY W. DEAN, OF NORRISTOWN, ASSIGNOR OF PART TO JOHN MUNDELL, OF PHILADELPHIA, PENNSYLVANIA, SIMON A. BUTLER, OF BOSTON, AND EMMA F. LOTHROP AND JOSEPH HERBERT BOWEN, BOTH OF LYNN, MASSACHUSETTS.

TACK-FEEDING TUBE.

SPECIFICATION forming part of Letters Patent No. 418,695, dated January 7, 1890.

Application filed May 1, 1889. Serial No. 309,262. (No model.)

*To all whom it may concern:*

Be it known that I, HENRY WELLINGTON DEAN, a citizen of the United States, residing at Norristown, in the county of Montgomery and State of Pennsylvania, have invented a new and useful Improvement in Flexible Tack-Feeding Tubes, of which the following is a specification.

My improvement relates to devices for feeding tacks to a driver adapted to be used in connection with a suitable support for the last in the operation of lasting the upper to the inner sole of a shoe.

My improvement is particularly adapted for use as a feed-tube for the tacks of a tacking-machine in which a universally-movable tack-driving head is suspended by said feed-tube and has its driver operated by compressed air, as in a patent granted to me April 3, 1888, for nailing-machine; and the objects of my improvement are to provide a non-collapsible flexible tube having a metallic feed-passage wherein the tacks will be prevented from catching and clogging and to render the feed-tube flexible within certain limits without being liable to cause the tacks to catch upon its walls. In effecting these objects I provide a rubber tube with a metallic lining composed of tubular sections joined together by ball-and-socket joint adapted by a circumferential shoulder to control the flexing of the tube within certain limits, each section having its interior passage formed of two truncated cones joined at their apices within the passage, whereby to form a passage which will center the tack in passing the joint and prevent it from catching, whether the tube be flexed or straight. This construction contracts the passage preferably near the joint of each section, and it enlarges the passage at the joining ends of the sections, so that a tack passing the joint when the tube is flexed will have its head in the contracted end of one section and its point in the enlarged end of the other section, and will thereby be centered and have a perfectly free course through the tube under all conditions of its use in handling the driver-head. This construction also gives the advantage of rendering the metallic passage practically air-tight, and thereby relieves the rubber tube from undue pressure from the compressed air within it, while at the same time it prevents the collapsing of the tube under the action of a vacuum produced therein to effect the proper and swift descent of the tack.

While my improved tack-feeding tube is specially adapted for use with a tack-driving device operated by compressed air, as stated, yet it is obvious that it may be used as a tack-conduit without such driver-head and in relation to any tack-driving mechanism, or with said driving device operated by steam.

The specific features of novelty are shown in the accompanying drawings, and will be particularly set forth in the claims concluding this specification.

In the drawings referred to I have illustrated my improved tack-feeding tube in connection with a driver-head controlled in the hands of the operator for free movement, and it will be understood that in such application the driver-head is suspended by the said feed-tube from the raceway of the tack-supplying devices, and that suitable appliances are provided for supplying compressed air and exhausting it in the operation of driving the tacks delivered by said tube to the driver. As these illustrations are given to show a particular use for my improved tack-feeding tube, it is deemed unnecessary to describe them or the operation of driving the tacks.

Referring to the drawings, Figure 1 shows in elevation the complete machine in connection with an ordinary last-supporting jack. Fig. 2 is a portion of the feeding-tube, enlarged, with the rubber covering partially removed; and Fig. 3 is a longitudinal section of a portion of the tube bent or flexed, as will occur in the free movement of the driver-head in practical use.

A denotes a tack-driving head as is described and shown in my said patent, and it will be understood that it is connected with the raceway of the tack-supplying hopper and suspended therefrom by flexible tubes, one of which is the tack-feeding tube $a$, which forms a continuous passage in the head, the driver-pin whereof is operated by compressed air.

The tube $a$ is preferably of rubber, and the metallic lining consists of tubular sections $b$, preferably of equal length and about an inch or an inch and a half long, and of a diameter to fit closely within the rubber tube. These sections are joined by ball-and-socket joint, one end $c$ of each section being made spherical, or substantially so, and the interior of the other end $d$ is made of corresponding socket form to receive and fit exactly the spherical end of the connecting-section to form a continuous metallic passage for the tacks. The spherical end is of a less diameter than the body of the section, so as to fit within the joint-forming socket of the next section to make a uniform exterior of all the sections and to form an annular shoulder $e$ at the junction of the spherical end with the connecting-section, the purpose of which shoulder is to form a stop to limit the flexure of the sections and prevent the opening of the joint in flexing the tube. For this purpose the socket end of the section is caused to abut against the said shoulder whenever the tube is flexed beyond a certain limit and thus prevent the opening of the joint, which would endanger the catching of the points of the tacks and obstruct the passage. The interior of each tubular section flares toward each end—that is to say, it has the form of two hollow cones $f$ and $g$, the one $f$ flaring toward the socket end of the section being preferably longer than the one flaring toward the spherical end of the section. This gives a passage in each section comparatively narrow near the spherical end and enlarged at the joint-forming ends.

By having the flaring passage at the joint and the socket end of each section standing uppermost in the tube, it will be seen that the sectional conduit forms a passage, within which the tacks can have no point for lodgment in their passage to the driver. This important advantage is due to the form of the passage of each section, so that the tack in passing the joint when flexed will have ample room to turn the bend, and cannot be wedged or bound, however quickly the tube may be flexed in handling the driver. This construction gives a tack-passage narrow at certain points and wide at certain points, with a joint capable of flexing at the wide points within limits.

While I have described and illustrated my improved tack-feeding tube in connection with lasting shoes, it is obvious that it may be used for other work—such, for instance, as nailing on the tops of cigar-boxes. It is also obvious that the metallic sections may be employed as a tack-feeding tube with any suitable inclosing-tube—as, for instance, when feeding tacks to a tacking-machine operated otherwise than by compressed air.

I have put the metallic sections into the tube by pushing one section therein at a time by means of the succeeding section, and this way I prefer for short lengths of tubes.

The inclosing-tube is properly connected at each end with its operating parts.

The state of the art shows to be old an air-tight flexible tube having a lining composed of metallic tubular sections, and each section having its bore enlarged at one end for the reception of the small end of the adjacent section. It also shows such a tube having a foundation composed of two distinct spiral lengths of flattened metal, in which the interior surface is interrupted by the edges of the coils, and it also shows such a tube having a foundation composed of interior and exterior band-like rings, the said rings being provided, respectively, with inwardly end-projecting flanges and outwardly end-projecting flanges, and in which the interior surface is interrupted by the flanged ends of the said sections. In the construction in which the bore of each section is enlarged at one end for the reception of the small end of the coupled section there is no provision for limiting the flexure of the coupled sections and the bore is of uniform diameter throughout the length of the tube. These sections would therefore be liable to open and catch upon each other at their ends, and the tacks would be liable to catch at the open joints and to become stuck crosswise in the tube in using the latter as a conductor for a universally-movable tack-driving head manipulated in the hands of the operator.

The other constructions are not adapted for feeding tacks, and it would be impossible to use them for such purpose, because every tack would be liable to catch at the joints, whether the tube be flexed or not.

By my improvement the inner walls of the sections are constructed in such manner as to keep the points of the tacks centrally within the sections.

By my improvement the sections are joined so as to permit their flexure within certain limits, and at the same time to maintain a practically smooth and unbroken surface at the joints of the sections under all conditions of the flexure of the tube.

I claim as my improvement—

1. A metal lining for a flexible tack-feeding tube composed of metallic sections, each section terminating at one end in a ball formation of less diameter than the external diameter of the tube and forming a circumferential shoulder, the bore of each section being contracted to flare toward each end from such contraction, one of said flaring portions terminating at the ball end and the other ending in a socket corresponding to the ball, whereby the flexure of the sections is controlled within certain limits, in combination with a suitable casing, as set forth.

2. A metallic lining for a flexible tack-feeding tube, consisting of tubular sections, each having a ball at one end of less diameter than the external diameter of the tube, and a circumferential shoulder joining said ball, and a socket at the other end corresponding to said ball, each section having a bore formed with a contraction about coincident with said shoulder, and truncated conical portions of unequal lengths extending from said contraction, in combination with a rubber inclosing-tube, whereby the tack is centered in passing the joints of the sections point foremost, as set forth.

In testimony whereof I have hereunto set my hand in the presence of two subscribing witnesses.

HENRY W. DEAN.

Witnesses:
A. E. H. JOHNSON,
JAMES MUNDELL.